(12) United States Patent
Bäcklund

(10) Patent No.: US 6,234,203 B1
(45) Date of Patent: May 22, 2001

(54) DIAPHRAGM VALVE AND A VALVE HOUSING FOR A DIAPHRAGM VALVE

(75) Inventor: Ingvar Bäcklund, Lidingö (SE)

(73) Assignee: Robovlave AB, Lidingo (SE)

(*) Notice: Subject to any disclaimer, the term of this patent is extended or adjusted under 35 U.S.C. 154(b) by 0 days.

(21) Appl. No.: 09/486,260

(22) PCT Filed: Sep. 9, 1998

(86) PCT No.: PCT/SE98/01606

§ 371 Date: Feb. 24, 2000

§ 102(e) Date: Feb. 24, 2000

(87) PCT Pub. No.: WO99/13251

PCT Pub. Date: Mar. 18, 1999

(30) Foreign Application Priority Data

Sep. 9, 1997 (SE) .................................................. 9703255

(51) Int. Cl.[7] .................................................. F17D 1/00
(52) U.S. Cl. .................................................. 137/597; 251/61.1
(58) Field of Search ........................... 137/597; 251/61.1

(56) References Cited

U.S. PATENT DOCUMENTS

| 5,277,224 | * | 1/1994 | Hutton et al. | 137/597 |
| 5,335,691 | * | 8/1994 | Kolenc | 137/312 |
| 5,762,314 | * | 6/1998 | Williams | 251/25 |
| 6,082,398 | * | 7/2000 | Girard et al. | 137/599 |
| 6,112,767 | * | 9/2000 | Pinkham | 137/597 |

FOREIGN PATENT DOCUMENTS

| 0618389 | 10/1994 | (EP). |
| 9500782 | 1/1995 | (WO). |
| 9717558 | 5/1997 | (WO). |
| 9845629 | 10/1998 | (WO). |

* cited by examiner

*Primary Examiner*—A. Michael Chambers
*Assistant Examiner*—Thomas L. McShane
(74) *Attorney, Agent, or Firm*—Birch, Stewart, Kolasch & Birch, LLP

(57) ABSTRACT

A housing of diaphragm valve has two valve chambers (11, 12). A central channel (21, 22) opens in each valve chamber and has an external connection (B, D). On each side of the central channels there are first (17, 19) and second side channels (18, 20) having an external connection (A, C). Each valve chamber has two valve seats (13, 14, 15, 16). Diaphragms (23, 24) are arranged to seal against the valve seats. Control means (25, 26) are arranged to press portions of the diaphragms (23, 24) against one valve seat each, thereby shutting passage between a central channel and a side channel, and to raise portions of the diaphragms off the valve seats, thereby to open passage between a central channel and a side channel. The first side channels (17, 19) are interconnected and both are connected to a common external connection (A), and the second side channels (18, 20) are interconnected and both are connected to a common external connection (C).

10 Claims, 5 Drawing Sheets

STATE OF ART

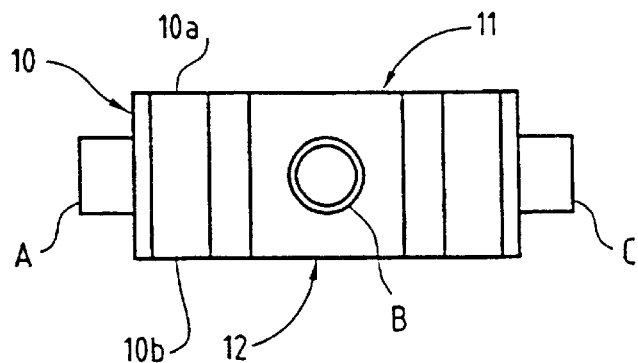
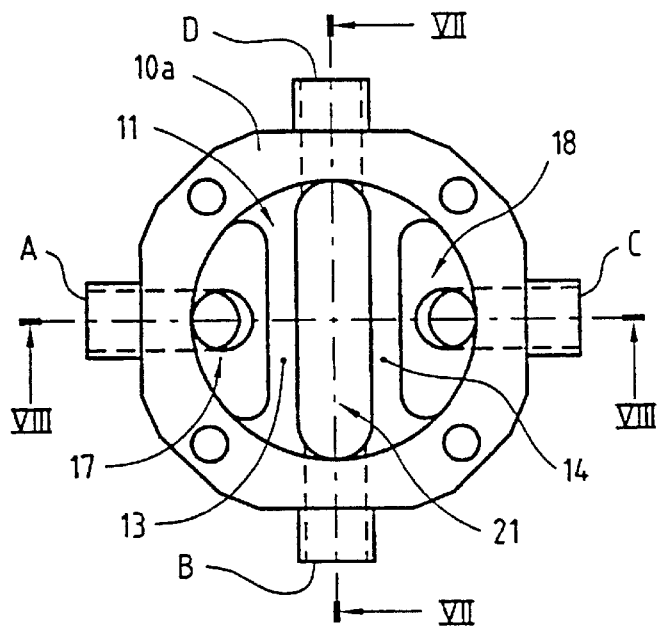
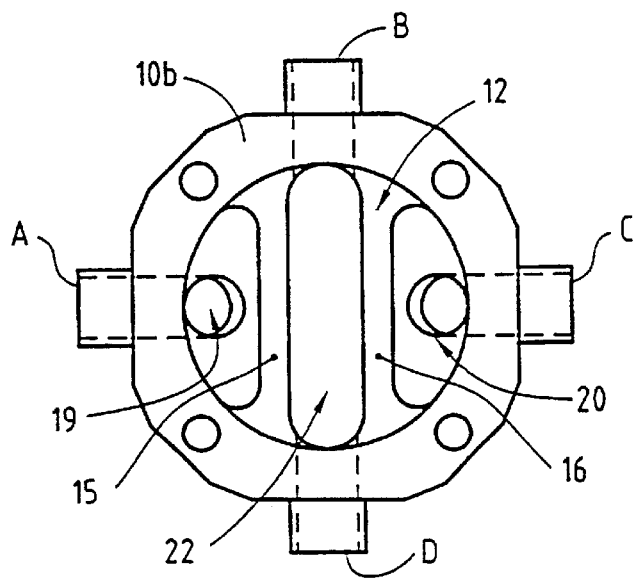

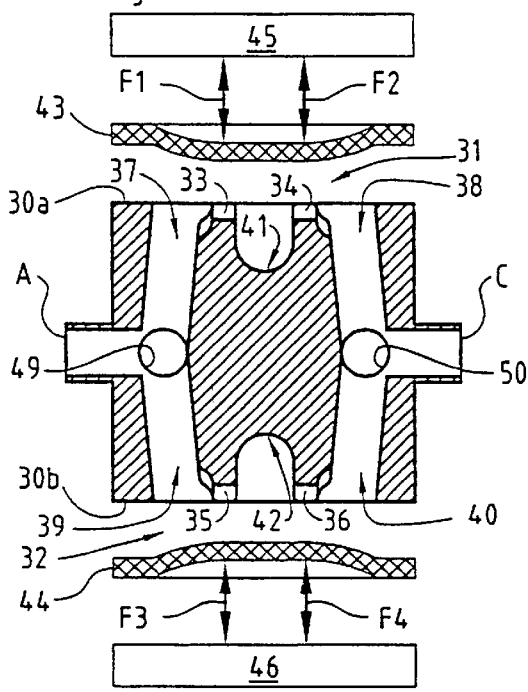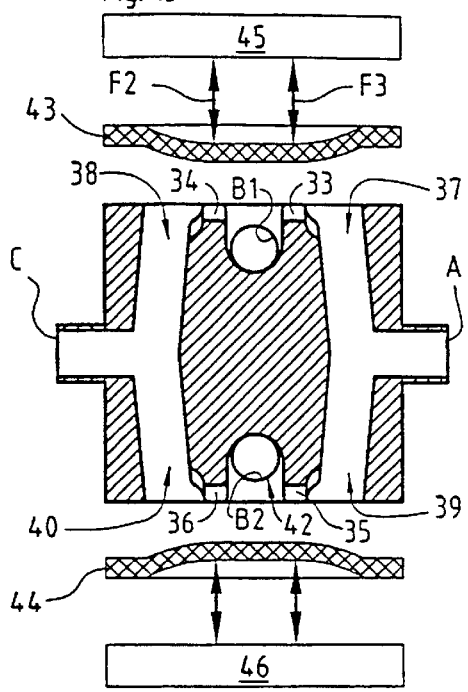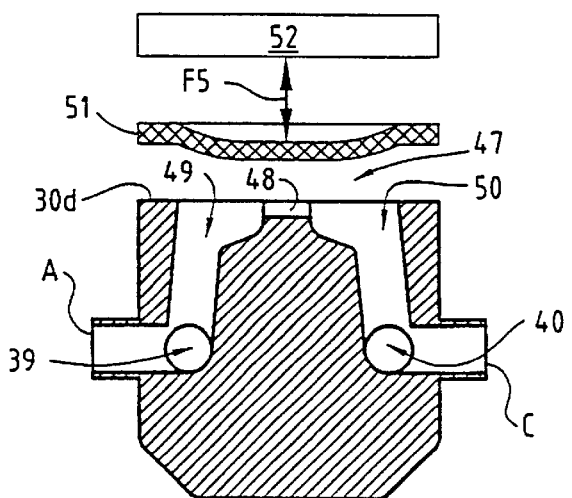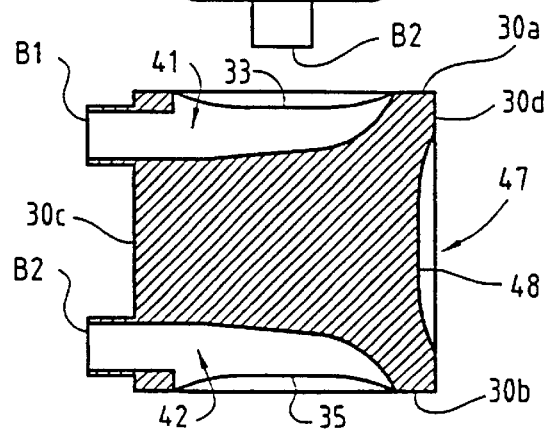

US 6,234,203 B1

DIAPHRAGM VALVE AND A VALVE HOUSING FOR A DIAPHRAGM VALVE

This application is the national phase under 35 U.S.C. §371 of PCT International Application No. PCT/SE98/01606 which has an International filing date of Sep. 9, 1998, which designated the U.S.

The present invention concerns a diaphragm valve and a valve housing therefor having at least two valve chambers in one valve housing block.

The diaphragm valve of the present invention is related to the diaphragm valves disclosed in WO 95/00782, WO 97/17558 and PCT/SE98/00621, all by the same inventor.

The valve according to WO 95/00782 includes a valve housing having a substantially circular valve chamber, into which opens a central channel and on each side thereof a first side channel and a second side channel. Each side channel has an external connection for fluid and is separated from the central channel by means of a respective one of two substantially parallel valve seat means extending like chords across the valve chamber. Each valve seat means provides a substantially linear valve seat for an elastic diaphragm. The diaphragm is adapted to be brought into and away from sealing contact with at least one of the valve seat means. Two individually operable control means are adapted both to press a respective linear portion of the diaphragm against a respective valve seat, thereby to shut passage of fluid between the central channel and a respective side channel, and to positively raise a respective portion of the diaphragm off a respective one of the valve seat, thereby to open a flow passage between the central channel and the respective side channel.

In the valve according to WO 97/17558, the valve housing is provided with a second substantially circular valve chamber, into which opens a fourth channel having an external connection for fluid and which communicates with the central channel through an opening in the valve housing. A second elastic diaphragm is provided and is adapted to be brought into and away from sealing engagement with a third valve seat means provided in the second valve chamber. A third control means is arranged both to press the second diaphragm against the third valve seat means, thereby to shut passage of fluid between the fourth channel and the central channel, and to release the diaphragm from its engagement with the third valve seat means, thereby to open passage of fluid between the fourth channel and the central channel.

Common to the two prior art valves mentioned is a central channel having direct communication with an associated port. Consequently, this port becomes involved also in fluid transfer between the remaining two ports in the valve according to WO 95/00782 and between any combination of two of the remaining three ports in the valve according to WO 97/17558.

In a diaphragm valve of the kinds described above, the valve seats can be characterized as thresholds or weirs between adjacent channels and associated ports. Communication between two ports is established by fluid passage across but one threshold.

The valve according to PCT/SE98/00621 allows transfer of fluid between any combination of at least two of its ports without any other port being involved. This is achieved in that the central channel is replaced by a central space having no direct communication with any port. Fluid passage from a port to the central space must take place across a threshold, and passage from the central space to any other port must take place across a further threshold. Thus, all flow across the valve has to pass the central space.

These prior art valves can manage but one flow at a time, unless mixing of two fluids is concerned.

A first object of the present invention is to provide a diaphragm valve capable of managing two simultaneously incoming separate flows and that is capable of directing each flow in two optional outgoing directions.

A second object is to provide a diaphragm valve as just stated-also enabling by-pass of a flow from an inlet port to an outlet port.

These objects are achieved by membrane valves and valve housings for such valves as stated in the appended claims.

The objects stated will become more apparent from the annexed drawing schematically showing in FIG. 1 the principle of an arrangement of four 2-way valves enabling to manage two incoming flows and to direct them in two optional outgoing directions (first object), in FIGS. 2a and 2b two different positions of a state-of-the-art valve having the properties of the FIG. 1 arrangement, and in FIG. 3 the arrangement of FIG. 1 completed by a further 2-way valve enabling by-pass between two ports.

The arrangement of FIG. 1 includes four 2-way valves a, b, c and d interconnected so that valves a and d have one common port A, valves a and b one common port B, valves b and c one common port C, and valves c and d one common port D. A flow coming in at port A may be directed through valve a to port B, and, at the same time a flow coming in at port C may be directed through valve c to port C. Alternatively, the flow coming in at port A may be directed through valve d to port D and, at the same time the flow coming in at port C may be directed through valve b to port D.

The state-of-the-art valve according to FIG. 2 performing like the arrangement of FIG. 1 has a cylindrical valve housing 1 and a valve body 2 rotatable therein between a first position shown in FIG. 2a and a second position shown in FIG. 2b. As appears from FIG. 2a, a flow coming in at port A is directed to port B, whereas a flow coming in at port C is directed to port D. In the second position of the valve body shown in FIG. 2b the flow coming in at port AB is directed to port D and the flow coming in at port C is directed to port B.

It is the first object of the present invention to provide a diaphragm valve performing like the arrangement of FIG. 1 and the state-of-the-art valve according to FIG. 2.

Figure 1:
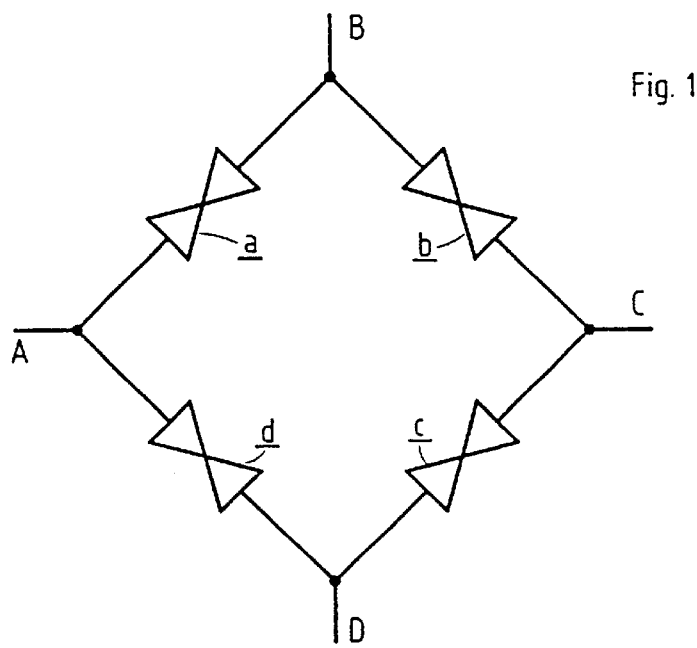
Figure 3:
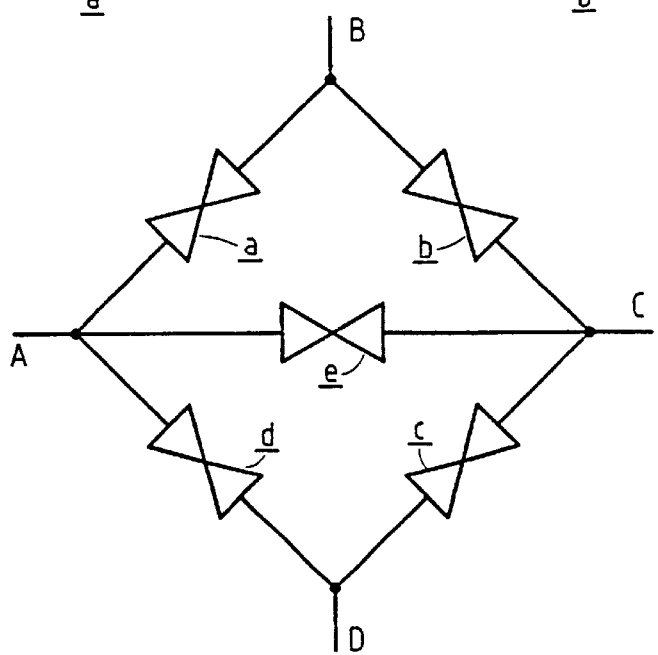

In FIG. 3 is shown the valve arrangement of FIG. 1 completed with a fifth valve e allowing by-pass from port A to port C. It is the second object of the present invention to provide a diaphragm valve having the properties of the FIG. 3 valve arrangement.

Figure 7:
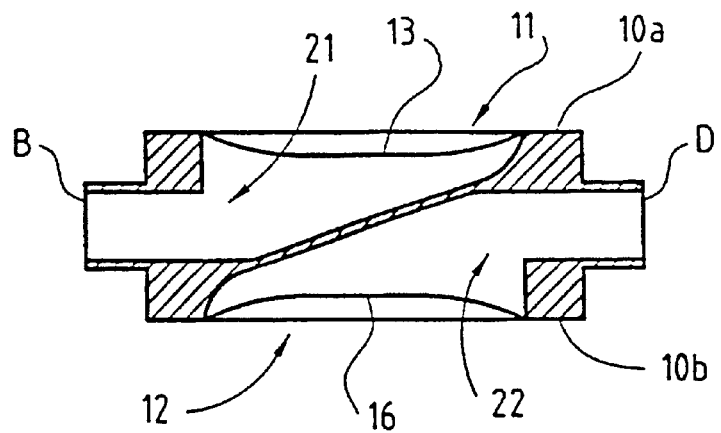
Figure 8:
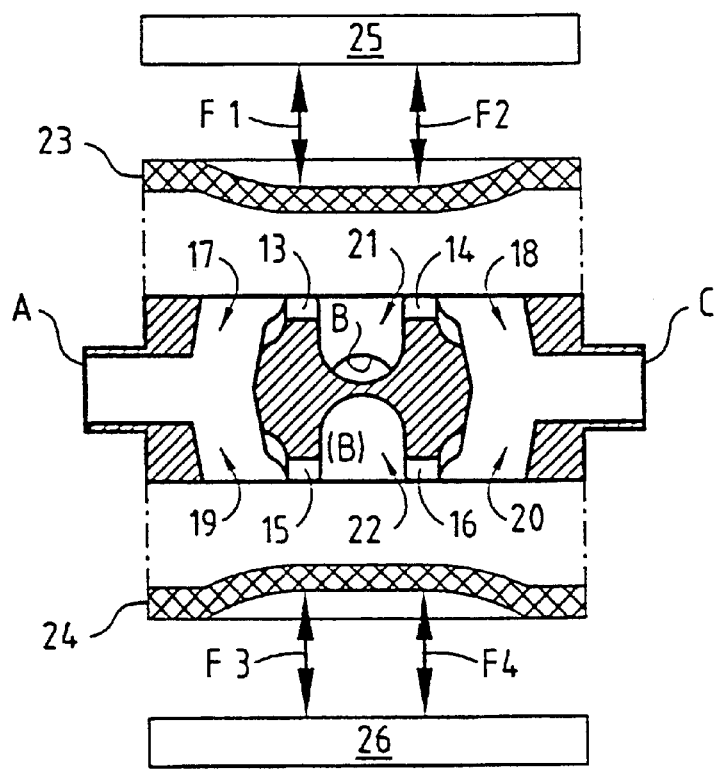
Figure 9:
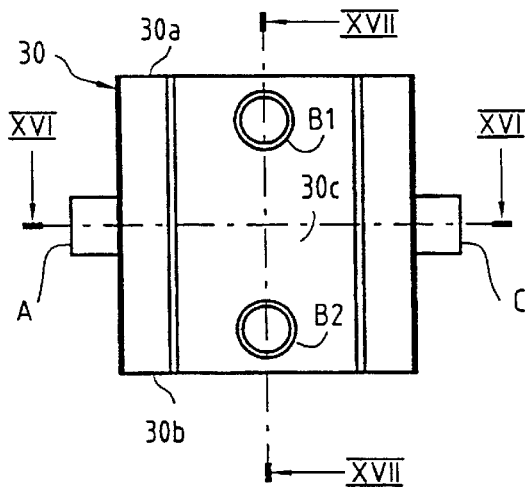
Figure 10:
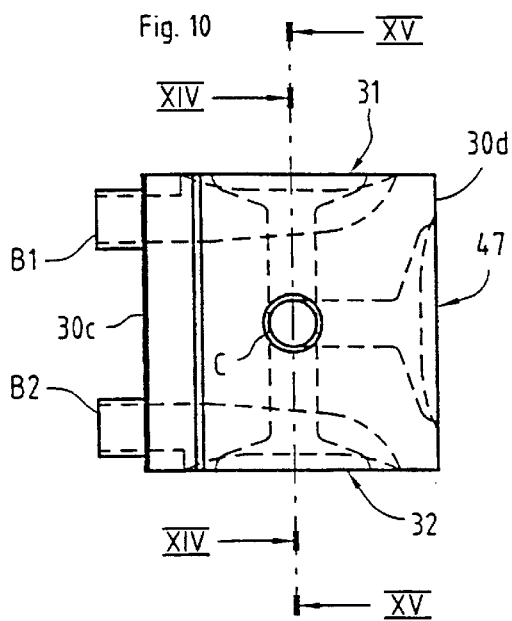
Figure 11:
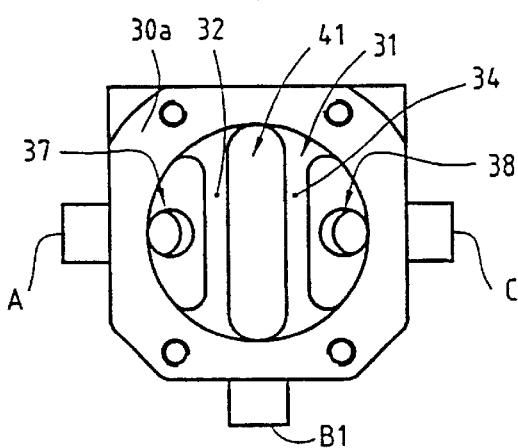
Figure 12:
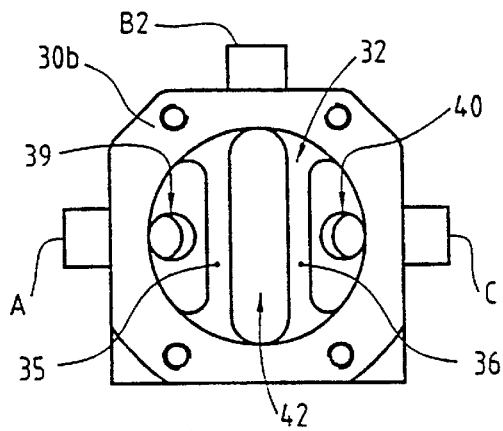
Figure 13:
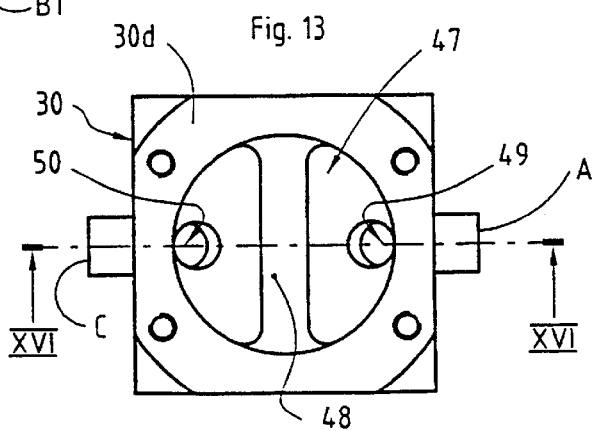

Embodiments; of the present invention will now be described, reference being made to FIGS. 4–17 of the accompanying drawings, wherein FIG. 4 is a side view of a valve housing of a first embodiment;

FIG. 5 is a top view of the valve housing of FIG. 1;

FIG. 6 is a bottom view of the valve housing of FIG. 1;

FIG. 7 is a vertical central section taken along line VII—VII in FIG. 5;

FIG. 8 is a vertical central section taken along line VIII—VIII in FIG. 5;

FIG. 9 is a first side view of a valve housing of a second embodiment;

FIG. 10 is a second side view seen from the right in FIG. 9 showing with broken lines the locations of the valve chambers;

FIG. 11 is a top view of the valve housing of FIG. 9;

FIG. 12 is a bottom view of the valve housing of FIG. 9;

FIG. 13 is a third side view of the valve housing seen from the right in FIG. 10;

FIG. 14 is a vertical central section taken along line XIV—XIV in FIG. 10;

FIG. 15 is a vertical central section taken along line XV—XV in FIG. 10;

FIG. 16 is a horizontal central section taken along lines XVI—XVI in FIGS. 9 and 13; and FIG. 17 is a vertical central section taken along line XVII—XVII in FIG. 9.

Like the diaphragm valve described in WO 97/17558, the valve according to the first embodiment of the present invention described with reference to FIGS. 4–8 includes a valve housing having a first, upper and a second, lower valve chamber, each having valve seat means and associated therewith an elastic diaphragm as well as an operating unit capable of controlling movements of the associated diaphragm so as to bring it into and away from sealing contact with the respective valve seat means.

Since it is preferred to utilize operating units as described in WO 97/17558 with the embodiments of the present invention, they will not be described herein in detail.

The first embodiment of the present invention described in FIGS. 4–8 includes a relatively flat, four port valve housing 10 having an upper valve chamber 11 and an identical lower valve chamber 12 provided in respective opposite parallel flat surfaces 10a, 10b of the valve housing. It appears from FIGS. 5 and 6 that the valve chambers are substantially circular in plan view, and from the sectional views of FIGS. 7 and 8 that they are substantially bowl or plate shaped in side view.

Extending like parallel chords across each of the valve chambers 11 and 12 are two substantially linear valve seat means in the shape of weirs or thresholds 13, 14 (upper valve chamber, FIG. 5), and 15, 16 (lower valve chamber, FIG. 6).

Interiorly provided in the valve housing 10 are channels 17, 18 (see FIG. 8) that open in the upper valve chamber 11 radially outside the thresholds 13, 14, respectively, and communicate with respective opposite ports A and C provided in the valve housing.

Also interiorly provided in the valve housing 10 are channels 19, 20 that open in the valve chamber 12 radially outside the thresholds 15, 16, respectively, and communicate with the ports A and C, respectively.

Consequently, the channels 17 and 19 communicate one with the other by both communicating with the port A, and, likewise, the channels 18 and 20 communicate one with the other by both communicating with the port C.

Between the thresholds 13, 14 of the upper valve chamber 11 is provided a recess or cavity 21 communicating with a port B provided in the valve housing (see FIG. 8). Likewise, between the thresholds 15, 16 of the lower valve chamber 12 is provided a recess or cavity 22 communicating with a port D provided in the valve housing opposite to the port B. The communication between the cavity 22 and the port D being invisible in FIG. 8 is indicated by [D].

As appears particularly from FIGS. 5, 6 and 8, the ports A and C are mutually aligned and diametrically opposed to each other as are the ports B and D.

It also appears that the mutually parallel thresholds 13 and 14 are parallel to the likewise mutually parallel thresholds 15 and 16, respectively.

In FIG. 8 are schematically shown an upper diaphragm 23 and a lower diaphragm 24 adapted for co-operation with the thresholds 13, 14 of the upper valve chamber 11 and with the thresholds 15, 16 of the lower valve chamber 12, respectively. In order not to interfere with details of the valve housing, the diaphragms are shown spaced from the upper surface 10a and the lower surface 10b, respectively, of the valve housing 10. In operation, the diaphragms are clamped between upper and lower operating units 25, 26 and the upper valve housing surface 10a and the lower valve housing surface 10b, respectively. Both operating units schematically shown in FIG. 8 are suitably of the first kind described in WO 97/17558 having two control means selectively movable in the directions indicated by arrows $F_1$, $F_2$, $F_3$ and $F_4$ to press one portion each of a diaphragm 23, 24 against a respective threshold 13, 14 and 15, 16, and to raise corresponding portions off the thresholds.

Figure 2:
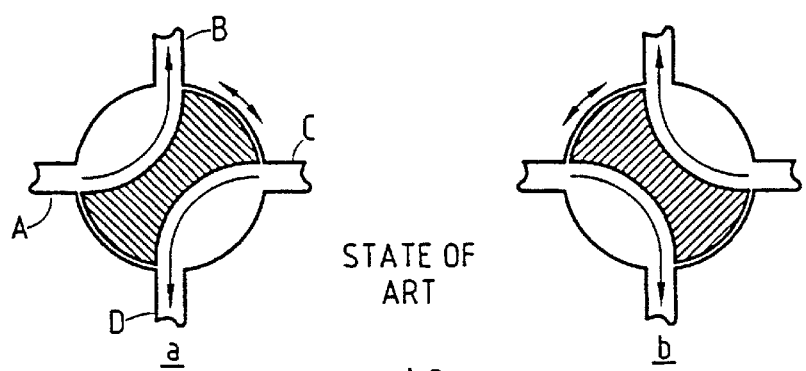
FIG. 2a is a schematic view of a state of the art valve in a first position.
FIG. 2b is a schematic view of a state of the art valve in a second position.

Now, to achieve the desired performance of the valve, i.e., a performance analogous to the performance of the valve arrangement of FIG. 1 and the valve of FIG. 2, diaphragm portions are pressed and raised as appears from the following table:

| | Communication between ports | | | |
|---|---|---|---|---|
| | A → B | C → D | A → D | C → B |
| $F_1$ | + | | − | − |
| $F_2$ | − | | | + |
| $F_3$ | | − | + | |
| $F_4$ | | + | − | − |

In the above table, a plus (+) or a minus (−) sign implies the direction of movement of the control means, a plus sign indicating a direction of movement to open flow passage across a threshold by raising a diaphragm portion off an associated threshold, and a minus sign indicating a direction of movement to shut flow passage across a threshold by pressing a diaphragm portion against an associated threshold.

Apparently, by simultaneously opening passage across thresholds 13 and 16 ($F_1$+; $F_4$+), flows from input torts A and C can be simultaneously directed to ports B and D, respectively. Likewise, by simultaneously opening passage across thresholds 15 and 14 ($F_3$+; $F_2$+), flows from input ports A and C can be simultaneously directed to ports D and B, respectively.

Evidently, other flow patterns may be obtained by other combinations of opening and closing passage across thresholds, such as, e.g., A→(B+D) by simultaneously opening passage across thresholds 13 and 15 ($F_1$+; $F_3$+) and closing passage across thresholds 14 and 16 ($F_2$−; $F_4$−). Even a by-pass function from port A to port C would be possible by simultaneously opening passage across both thresholds of a valve chamber, e.g., thresholds 13 and 14, and closing passage across the thresholds of the opposite valve chamber, as well as a by-pass function from port B to port D by simultaneously opening passage across two opposed thresholds, e.g., thresholds 13 and 15. Both these by-pass functions, however, involve communication with other ports, in the examples mentioned, port B and port A, respectively.

The second embodiment of the present invention described with reference to FIGS. 9–17 solves the problem of providing a by-pass function between two ports without other ports being involved.

The second embodiment includes a four port, substantially cubic valve housing 30 having a first upper valve chamber 31 and a second identical lower valve chamber 32 provided in respective opposite parallel flat surfaces 30a, 30b of the valve housing.

It appears from FIGS. 11 and 12 that the valve chambers are substantially circular in plan view, and from the sectional views of FIGS. 14 and 15 that they are substantially bowl or plate shaped in side view.

Extending like parallel chords across each of the valve chambers 31 and 32 are two substantially linear valve seat means in the shape of weirs or thresholds 33, 34 (upper valve chamber, FIG. 11), and 35, 36 (lower valve chamber, FIG. 12).

Interiorly provided in the valve housing 30 are channels 37, 38 (see FIG. 14) that open in the upper valve chamber 31 radially outside the thresholds 33, 34, respectively, and communicate with respective opposite ports A and C provided in the valve housing.

Also interiorly provided in the valve housing 30 are channels 39, 40 that open in the valve chamber 32 radially outside the thresholds 35, 36, respectively, and communicate with the ports A and C, respectively.

Consequently, the channels 37 and 39 communicate one with the other by both communicating with the port A, and, likewise, the channels 38 and 40 communicate one with the other by both communicating with the port C.

As appears particularly from, e.g., FIGS. 9 and 11, the ports A and C are mutually aligned and diametrically opposed to each other.

It also appears that the mutually parallel thresholds 33 and 34 are parallel to the likewise mutually parallel thresholds 35 and 36, respectively.

Like in the first embodiment, there is schematically shown in FIGS. 14 and 15 an upper diaphragm 43 and a lower diaphragm 44 adapted for cooperation with the thresholds 33, 34 of the upper valve chamber 31 and with the thresholds 35, 36 of the lower valve chamber 32, respectively, as well as upper and lower operating units 45, 46 of the kind previously referred to.

Like in the first embodiment, there is provided between the thresholds 33, 34 of the upper valve chamber 31 a recess or cavity 41, and between the thresholds 35, 36 of the lower valve chamber 32 a recess or cavity 42. Like in the first embodiment, these cavities communicate with respective ports B1 and B2. These ports, however, are not located on opposite sides of the valve housing, but on the same side 30c of the valve housing as appears from FIGS. 9 and 17.

As now described, the second embodiment of the present invention corresponds to the first embodiment in all essentials, except for the valve housing of the first embodiment being relatively flat, whereas the valve housing of the second embodiment is substantially cubic of a reason to be explained.

The second embodiment differs from the first one in that a third valve chamber 47 is provided in a flat side surface 30d of the valve housing opposite to the side 30c. The provision of the third valve chamber is the reason for locating both ports B1 and B2 on the same side of the valve housing, and also the reason for the valve housing being relatively high compared to the relative flat valve housing of the first embodiment.

It appears from FIG. 13 that also the valve chamber 47 is substantially circular in plan view, and from the sectional views of FIGS. 16 and 17 that it is substantially bowl or plate shaped in side view.

Extending diametrically across the valve chamber 47 is a substantially linear valve seat means in the shape of a weir or threshold 48.

Interiorly provided in the valve housing 30 are channels 49, 50 (see FIG. 16) that open in the valve chamber 47 on either sides of the threshold 48, and communicate with the ports A and C, respectively.

In FIG. 16 are schematically shown a diaphragm 51 adapted for co-operation with the threshold 48 as well as an associated operating unit 52. In operation, the diaphragm is clamped between the operating unit 52 and the valve housing surface 30d. The operating unit is of a kind having but one control means selectively movable in the directions indicated by an arrow $F_5$ to press a central portion of the diaphragm 51 against the threshold 48 and to raise that portion off the threshold.

Apparently, by opening passage of flow across the threshold 48, a direct by-pass communication is obtained between ports A and C, i.e., the function obtained by inserting a fifth 2-way valve e between the ports A and C in the valve arrangement of FIG. 1.

What is claimed is:

1. A diaphragm valve for controlling a flow of gaseous or liquid fluid and including a valve housing (10; 30) having a first and a second valve chamber (11, 12; 31, 32), into each of which open a central channel (21,22; 41,42) having an external connection (B,D; B1,B2) for fluid and on each side of the central channel a first side channel (17,19; 37,39) and a second side channel (18,20; 38,40) having each an external connection (A, C) for fluid, each valve chamber having first and second valve seat means (13,14, 15,16; 33,34, 35,36) arranged in the housing, first and second elastic diaphragms (23,24; 43,44) adapted to be brought into and away from sealing engagement with at least one of said first and second valve seat means of each valve chamber, first and second control means (25,26; 45,46) being arranged on one hand to press a respective portion of said first and second diaphragms (23,24; 43,44) against one valve seat means each, thereby to shut passage of fluid between a respective of said central channels and a respective side channel, on the other to positively raise one portion each of said first and second diaphragms off a respective one of said valve seat means, thereby to open passage of fluid between a respective one of said central channels and a respective side channel, characterized in that the first side channels (17,19) of the first and second valve chambers (11,12) are interconnected and both connected to a common external connection (A), and that the second side channels (18,20) of the first and second valve chambers (11,12) are interconnected and both connected to a common external connection (C).

2. A diaphragm valve according to claim 1, characterized in that the first and second valve chambers are provided in opposite flat surfaces (10a,10b; 30a,30b) of the valve housing.

3. A diaphragm valve according to claim 1 characterized in that the external connections (B,D) of the central channels (21,22) are provided in opposite walls of the valve housing.

4. A diaphragm valve according to claim 1 characterized by a third valve chamber into which open a third and a fourth channel (49,50) separated by a third valve seat means (48), said third and fourth channels being connected to a respective one of said external connections (A,C) of said first and second side channels, a third elastic diaphragm (51) adapted to be brought into and away from sealing engagement with said third valve seat means (48), and a third control means (52) arranged on one hand to press a respective portion of said third diaphragm (51) against said third valve seat means (48), thereby to shut passage of fluid between said third and fourth channels (49,50), on the other to positively raise said third diaphragm off said third valve seat means (48), thereby to open passage of fluid between said third and fourth channels.

5. A diaphragm valve according to claim 4, characterized in that the external connections (B1,B2) of the central channels (41,42) are provided in the same wall (30c) of the valve housing (30).

6. A valve housing for a diaphragm valve, comprising a solid block having a first and a second valve chamber (11, 12; 31, 32), into each of which open a central channel (21,22; 41,42) having an external connection (B,D; B1,B2) for fluid and on each side of the central channel a first side channel (17,19; 37, 39) and a second side channel (18,20; 38,40) having each an external connection (A, C) for fluid, each valve chamber having first and second valve seat means (13,14, 15, 16; 33,34, 35,36) arranged in the housing, characterized in that the first side channels (17,19) of the first and second valve chambers (11,12) are interconnected and both connected to a common external connection (A), and that the second side channels (18,20) of the first and second valve chambers (11,12) are interconnected and both connected to a common external connection (C).

7. A valve housing according to claim 6, characterized in that the first and second valve chambers are provided in opposite flat surfaces (10a,10b) thereof.

8. A valve housing according to claim 6 characterized in that the external connections (B,D) of the central channels (21,22) are provided in opposite walls thereof.

9. A valve housing according to claim 6, characterized by a third valve chamber into which open a third and a fourth channel (49,50) separated by a third valve seat means (48), said third and fourth channels being connected to a respective one of said external connections (A,C) of said first and second side channels.

10. A valve housing according to claim 9, characterized in that the external connections (B1,B2) of the central channels (41,42) are provided in the same wall (30c) of the valve housing thereof.

* * * * *